United States Patent
Nguyen et al.

(10) Patent No.: US 8,806,383 B2
(45) Date of Patent: Aug. 12, 2014

(54) INITIATION OF ACTIONS BY A PORTABLE COMPUTING DEVICE FROM A LOCKED STATE

(75) Inventors: Catherine T. Nguyen, Mountain View, CA (US); Nathan J. Fortin, Morgan Hill, CA (US); Rachid El Guerrab, Oceanside, CA (US); Key-Wan Sung, Irvine, CA (US); Matthew L. Oursbourn, Carlsbad, CA (US); Timothy R. Richards, San Diego, CA (US); Ogi Boras, San Diego, CA (US); Ryan W. Enslow, San Diego, CA (US); Joshua M. VanHeirseele, Kenosha, WI (US)

(73) Assignee: Motorola Mobility LLC, Libertyville, IL (US)

( * ) Notice: Subject to any disclaimer, the term of this patent is extended or adjusted under 35 U.S.C. 154(b) by 173 days.

(21) Appl. No.: 13/366,369

(22) Filed: Feb. 6, 2012

(65) Prior Publication Data
US 2013/0201199 A1  Aug. 8, 2013

(51) Int. Cl.
*G06F 3/033* (2013.01)
*G06F 3/041* (2006.01)
*G09G 5/00* (2006.01)

(52) U.S. Cl.
USPC ............ 715/863; 345/173; 345/179; 345/660

(58) Field of Classification Search
CPC ............ G09G 5/02; G06F 3/041; G06F 3/033
USPC .......................... 345/619, 589, 660, 156–184; 715/853–866; 713/150–154
See application file for complete search history.

(56) References Cited

U.S. PATENT DOCUMENTS

| | | | |
|---|---|---|---|
| 7,657,849 B2 | 2/2010 | Chaudhri | |
| 8,046,721 B2 | 10/2011 | Chaudhri | |
| 2009/0241072 A1 | 9/2009 | Chaudhri et al. | |
| 2011/0105193 A1 | 5/2011 | Lee et al. | |
| 2011/0279384 A1 | 11/2011 | Miller | |
| 2012/0174042 A1 | 7/2012 | Chang | |
| 2013/0174094 A1* | 7/2013 | Heo et al. | 715/835 |

OTHER PUBLICATIONS

Innoweb Tech LLC, "Goto Lockscreen", https://play.google.com/store/apps/details?id=com.innowebtech.g0t0, accessed from Internet Feb. 24, 2011.*

(Continued)

*Primary Examiner* — Ryan R Yang
*Assistant Examiner* — Michael Le
(74) *Attorney, Agent, or Firm* — Shumaker & Sieffert, P.A.

(57) ABSTRACT

A method and apparatus for performing an action while a portable computing device is in a locked state is disclosed. An unlock image is displayed in a first region of a touch-sensitive display. Responsive to detecting contact with the touch-sensitive display at the first region, an action image is displayed in a second region of the touch-sensitive display. While the unlock image remains stationary at the first region, movement of the contact with the touch-sensitive display is detected and a direction of movement of the contact is determined. Responsive to determining the direction of movement of the contact is towards the action image, the action image is visually modified to distinguish it from the unlock image. Responsive to the contact with the touch-sensitive display reaching the second region, an action associated with the action image is performed.

18 Claims, 6 Drawing Sheets

(56) References Cited

OTHER PUBLICATIONS

Image of Ice Cream Sandwich Unlock Screen, captured Jan. 9, 2011.
Innoweb Tech LLC, "Goto Lockscreen", https://play.google.com/store/apps/details?id=com.innowebtech.g0t0&feature=search_result#?t=W251bGwsMSwyLDEsImNvbS5pbm5vd2VidGVjaC5nMHQwIl0., accessed from Internet Jul. 26, 2012, 3 pages.
Zach H Frosty, "MagicLocker: Lockscreen App for Android", http://www.youtube.com/watch?v=zi4dvU9LxG4&feature=related, Oct. 7, 2011, 2 pages.

* cited by examiner

INITIATION OF ACTIONS BY A PORTABLE COMPUTING DEVICE FROM A LOCKED STATE

FIELD OF THE DISCLOSURE

The present disclosure relates generally to accessing data using a touch-sensitive display and more particularly to unlocking devices receiving data using a touch-sensitive display.

BACKGROUND

Touch-sensitive displays, or "touch screens," are increasingly used by many electronic devices, particularly portable computing devices. Touch-sensitive displays are commonly used to display graphics, text and/or video and also to allow user interaction with an electronic device. A touch-sensitive display detects and responds to contact with a region of the display. For example, a touch-sensitive display may be used to display one or more soft keys, menus or other items in different regions, and a user contacts the touch-sensitive display at a specific region to interact with a particular soft key, menu or other item.

Increasingly, touch-sensitive displays are used by portable computing devices, such as smartphones, tablet computers or personal digital assistants. However, this may result in unintentional activation or deactivation of applications or device functionality because of unintentional contact with regions of the touch-sensitive display. To avoid unintentional activation or deactivation because of unintentional contact with the touch-sensitive display, one or more lock conditions may be used to place the touch-sensitive display and/or one or more applications executed by a portable computing device in a locked state. While in a locked state, contact with the touch-sensitive display does not initiate execution of an application or functionality.

Conventionally, a touch-sensitive display transitions from a locked state to an unlocked state by accessing a set of regions of the touch-sensitive display in a pattern or contacting the touch-sensitive display along a predetermined path. However, creating and subsequently recalling the set of regions or predetermined path to access may inconvenience a device's user. This may impair a user's ability to quickly unlock a device.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following describes a method and apparatus for performing an action while a portable computing device is in a locked state. An unlock image is displayed in a first region of a touch-sensitive display and responsive to detecting contact with the touch-sensitive display at the first region, an action image is displayed in a second region of the touch-sensitive display. While the unlock image remains stationary at the first region, movement of the contact with the touch-sensitive display is detected and a direction of movement of the contact is determined Responsive to determining the direction of movement of the contact is towards the action image, the action image is visually modified. For example, the brightness of the action image or the size of the action image is increased relative to the unlock image or a highlighting image is displayed proximate to the action image. Responsive to the contact with the touch-sensitive display reaching the second region, an action associated with the action image is performed. For example, responsive to the contact region, the portable computing device transitions to an unlocked state.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

Figure 1:
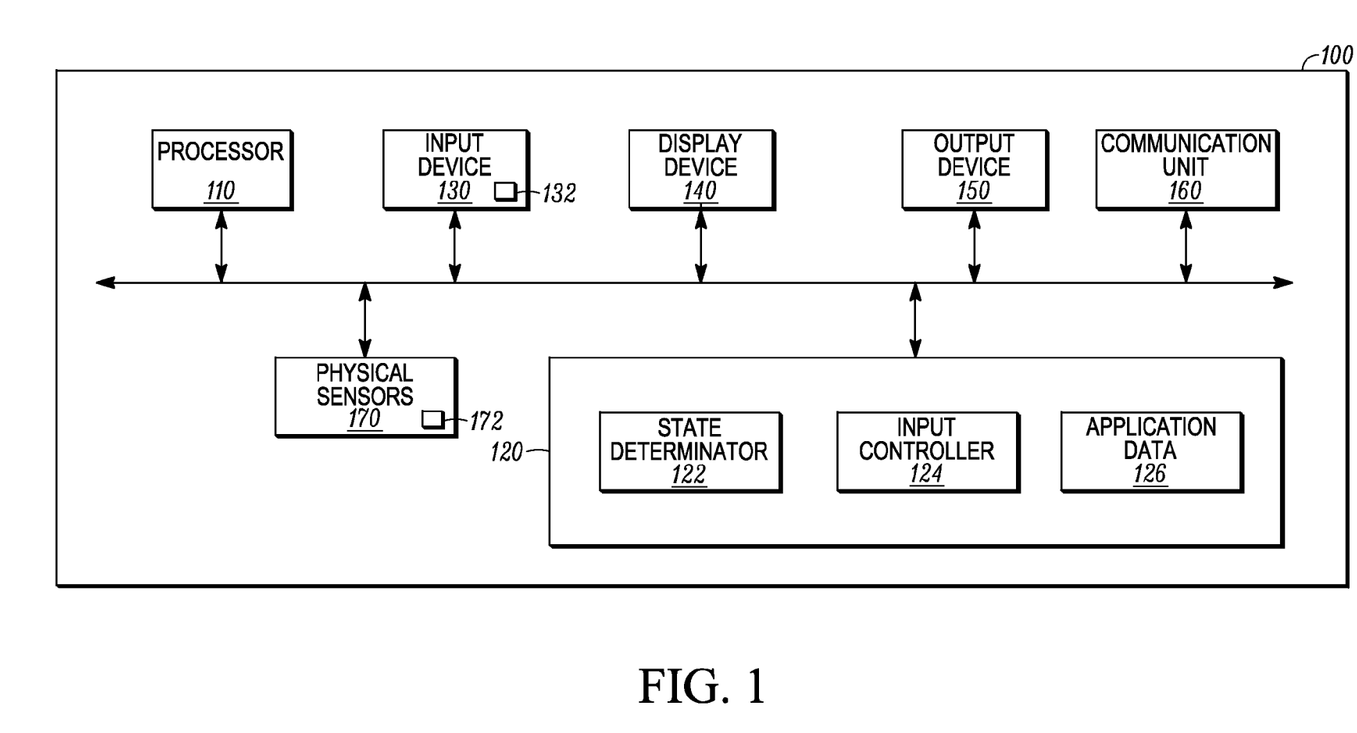
FIG. 1 is a block diagram of a portable computing device in accordance with some embodiments.

FIG. 1 is a block diagram of one embodiment of a portable computing device 100. In the embodiment shown by FIG. 1, the portable computing device 100 includes a processor 110, a storage device 120, an input device 130, a display device 140, an output device 150, a communication unit 160 and/or one or more physical sensors 170 that are coupled together via a bus 105. However, in different embodiments, the portable computing device 100 may include different and/or additional components than those illustrated by FIG. 1.

The processor 110 processes data or instructions and may comprise various computing architectures. For example, the processor 110 processes data or instructions using a complex instruction set computer (CISC) architecture, a reduced instruction set computer (RISC) architecture, an architecture implementing a combination of instruction sets or any other suitable instruction set. Although FIG. 1 shows a single processor 110, in other embodiments, the portable computing device 100 may include multiple processors. The processor 110 transmits, processes and/or retrieves data from the storage device 120, the input device 130, the display device 140, the output device 150, the communication unit 160 and/or one or more physical sensors 170.

The storage device 120 stores data and/or instructions that, when executed by the processor 110, cause the processor 110 to perform one or more actions or to provide one or more types of functionality. The data and/or instructions included in the storage device 120 may comprise computer-readable code that, when executed by the processor 110, performs one or more of the methods described herein and/or provides at least a subset of the functionality described herein. The storage device 120 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 120 may be a persistent storage device, a non-persistent storage device or a combination of a persistent storage device and a non-persistent storage device, in various embodiments. The storage device 120 is coupled to the processor 110, the input device 130, the display device 140, the output device 150, the communication unit 160 and/or one or more physical sensors 170 via the bus 105.

In the embodiment shown by FIG. 1, the storage device 120 includes a state determinator 122, an input controller 124 and application data 126. In other embodiments, the storage device 120 may include different and/or additional components than those shown in FIG. 1. The state determinator 122 comprises instructions that, when executed by the processor 110, controls a state of the portable computing device 100. A state of the portable computing device 100 describes how the portable computing device 100 responds to receipt of input or modifies a manner in which the portable computing device 100 receives input. In one embodiment, the state determinator 122 determines whether the portable computing device 100 is in a locked state or is in an unlocked state. In other embodiments, the state determinator 122 determines a state of the portable computing device 100 from a set of states.

For example, the state determinator 122 determines whether one or more locking conditions have been satisfied and places the portable computing device 100 in a locked state responsive to satisfaction of one or more locking conditions. Examples of locking conditions include receipt of an input to lock the portable computing device 100, lapse of a predetermined period of inactivity or any other suitable condition. In the locked state, components of the portable computing device 100 receive power but the portable computing device 100 does not perform an action responsive to most input received via an input device 130 and/or a physical sensor 170. The state determinator 122 may communicate with the display device 140 to display text and/or images indicating the portable computing device 100 is in a locked state. Data displayed on the display device 140 while the portable computing device 100 is in a locked state is also referred to herein as a "lockscreen."

In one embodiment, the portable computing device 100 is prevented from performing a specified set of functions and/or operations responsive to a received input from the input device 230 and/or from a physical sensor 270. For example, the portable computing device 100 does not execute one or more applications or transition between different displays while in a locked state. While in a locked state, the portable computing device 100 performs an action responsive to receiving an input included in a set of inputs. For example, the state determinator 122 transitions the portable computing device 100 to the unlocked state responsive to an input device 130 receiving an input included in a set of inputs associated with unlocking the portable computing device 100.

The state determinator 122 also determines whether an unlocking condition has been met and places the portable computing device 100 in an unlocked state responsive to satisfaction of an unlocking condition. While in the unlocked state, the portable computing device performs actions and/or functions in response to the input device 130 or to a physical sensor 170 receiving an input. For example, while in the unlocked state, the portable computing device 100 executes an application responsive to an input device 130 receiving an input.

The input controller 124 comprises instructions that, when executed by the processor 110, determines whether an input device 130 receives an input and communicates a received input to an application or another component of the portable computing device 100. For example, the input controller 124 detects contact with a region of a touch-sensitive display and generates data identifying an application or device action corresponding to the contacted region of the touch-sensitive display. In some embodiments, the input controller 124 also receives input from the state determinator 120 and limits the actions performed responsive to receiving inputs. For example, while in a locked state, the input controller 124 generates data for performing an action responsive to an input device 130 receiving an input associated with unlocking the portable computing device 100, but does not generate data for performing an action responsive to other inputs received by an input device 130.

In one embodiment, the input controller 124 also determines additional attributes of input received by an input device 130. For example, the input controller 124 determines whether a touch-sensitive display is contacted and determines motion of a contact with the touch-sensitive display. When the input controller 124 determines motion of a contact with the touch-sensitive display, the input controller 124 may determine speed, velocity, direction and/or acceleration of the contact with the touch-sensitive display.

The application data 126 comprises instructions that, when executed by the processor 110, provide functionality to a user of the portable computing device 100 or to the portable computing device 100. For example, the application data 126 includes data for executing a web browser, allowing the portable computing device 100 to receive input identifying a content provider or a server via an input device 130 and to retrieve data from the identified content provider or server. Additional examples of the application data 126 include a text editor, a word processor, an email client, a messaging client, a calendar, an address book, a telephone dialer, an image gallery or any other suitable type of functionality.

The input device 130 is any device configured to receive input and to communicate the received input to the processor 110, to the storage device 120 or to another component of the portable computing device 100 via the bus 105. For example, the input device 130 comprises a cursor controller, a touch-sensitive display 132 or a keyboard. In one embodiment, the input device 130 includes an alphanumeric input device, such as a keyboard, a key pad, representations of such created on a touch-sensitive display or another device adapted to communicate information and/or commands to the processor 110 or to the storage device 120. In another embodiment, the input device 130 comprises a device for communicating positional data as well as data or commands to the processor 110 or to the storage device 120 such as a joystick, a mouse, a trackball, a stylus, a touch-sensitive display, directional keys or another suitable input device known in the art.

In one embodiment, the input device 130 includes a touch-sensitive display 132 that displays data to a user and also receives input from a user. Responsive to tactile or haptic contact with the touch-sensitive display 132, the input controller 124 generates signals. The input controller 124 generates different signals responsive to different regions of the touch-sensitive display 132 being contacted, allowing interaction with different regions to the touch-sensitive display 132 to perform different actions. In various embodiments, the touch-sensitive display uses liquid crystal display (LCD) or light emitting polymer display (LPD) techniques to display data, although any suitable display technique may be used. Additionally, the touch-sensitive display 132 may detect contact using a variety of methods, such as capacitive, resistive, surface acoustic wave, infrared, proximity sensor arrays or any other suitable technique.

The display device 210 is a device that displays electronic images and/or data. For example, the display device 140 comprises an organic light emitting diode display (OLED), a liquid crystal display (LCD) or any other suitable device, such as a monitor. In one embodiment, the display device 140 includes a touch-sensitive transparent panel for receiving data or allowing other interaction with the images and/or data displayed by the display device 140.

The output device 150 comprises one or more devices that convey data or information to a user of the portable computing device 100. For example, the output device 150 includes one or more speakers or headphones for presenting audio data to a user. As another example, the output device 150 includes one or more light emitting diodes (LEDs) or other light sources to provide visual data to a user. As another example, the output device 150 includes one or more devices for providing vibrational, or haptic, feedback to a user. The above are merely examples and the output device 150 may include one or more devices for providing auditory output, tactile output, visual output, any combination of the preceding or any other suitable form of output.

The communication unit 160 transmits data from portable computing device 100 to a network and/or to other portable computing devices 100. In one embodiment, the communication unit 160 comprises a wireless transceiver that transmits and/or receives data using one or more wireless communication protocols. For example, the communication unit 160 includes one or more wireless transceivers transmitting and/or receiving data using one or more wireless communication protocols, such as IEEE 802.11 a/b/g/n (WiFi), Global System for Mobile (GSM), Code Division Multiple Access (CDMA), Universal Mobile Telecommunications System (UMTS), General Packet Radio Service (GPRS), second-generation (2G), or greater, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax), near field communication (NFC), BLUETOOTH® or another wireless communication protocol. In another embodiment, the communication unit 160 is a network adapter or other type of wired communication port for communicating with a network or with another portable computing device 100 using a wired communication protocol, such as Universal Serial Bus (USB), Ethernet or another suitable wired communication protocol. In yet another embodiment, the communication unit 160 comprises a combination of one or more transceivers and a wired network adapter, or similar wired device.

The one or more physical sensors 170 capture data describing an environment external to the portable computing device 100 and/or physical properties of the portable computing device 100. The one or more physical sensors 170 are coupled to the processor 110, storage device 120, input device 130, display device 140, output device 150 and/or communication unit 160 via the bus 105. For example, a physical sensor 170 comprises a light sensor generating data describing an amount of ambient light. As another example, a physical sensor 170 comprises a microphone capturing audio data. Another example of a physical sensor 170 is a proximity sensor generating data describing the distance from the portable computing device 100 to an object, such as a user. Additional examples of physical sensors 170 include one or more devices capturing a temperature of the portable computing device 100 or of an environment including the portable computing device 100, a humidity of the environment including the portable computing device 100 or a pressure applied to the one or more devices. However, the above are merely examples of physical sensors 170, and in various embodiments different and/or additional types of physical sensors 170 may be used.

In one embodiment, a physical sensor 170 comprises an orientation sensor 172 determining an orientation associated with the portable computing device 100. For example, the orientation sensor 172 comprises a tilt sensor measuring tilting in two or more axes of a reference plane. In one embodiment, the orientation sensor 172 comprises an accelerometer determining an orientation of the portable computing device 100. The orientation sensor 172 may generate a first control signal responsive to determining the portable computing device 100 has a first orientation and generates a second control signal responsive to determining the portable computing device 100 has a second orientation. For example, the orientation sensor 172 generates the first control signal responsive to determining the portable computing device 100 has a first orientation relative to a reference plane and generates the second control signal responsive to determining the portable computing device 100 has a second orientation relative to the reference plane. For example, the orientation sensor 172 generates the first control signal responsive to being perpendicular to a reference plane and generates the second control signal responsive to being parallel to the reference plane. In one embodiment, the first orientation and the second orientation are orthogonal to each other, such as a landscape orientation and a portrait orientation.

Methods

Figure 2:
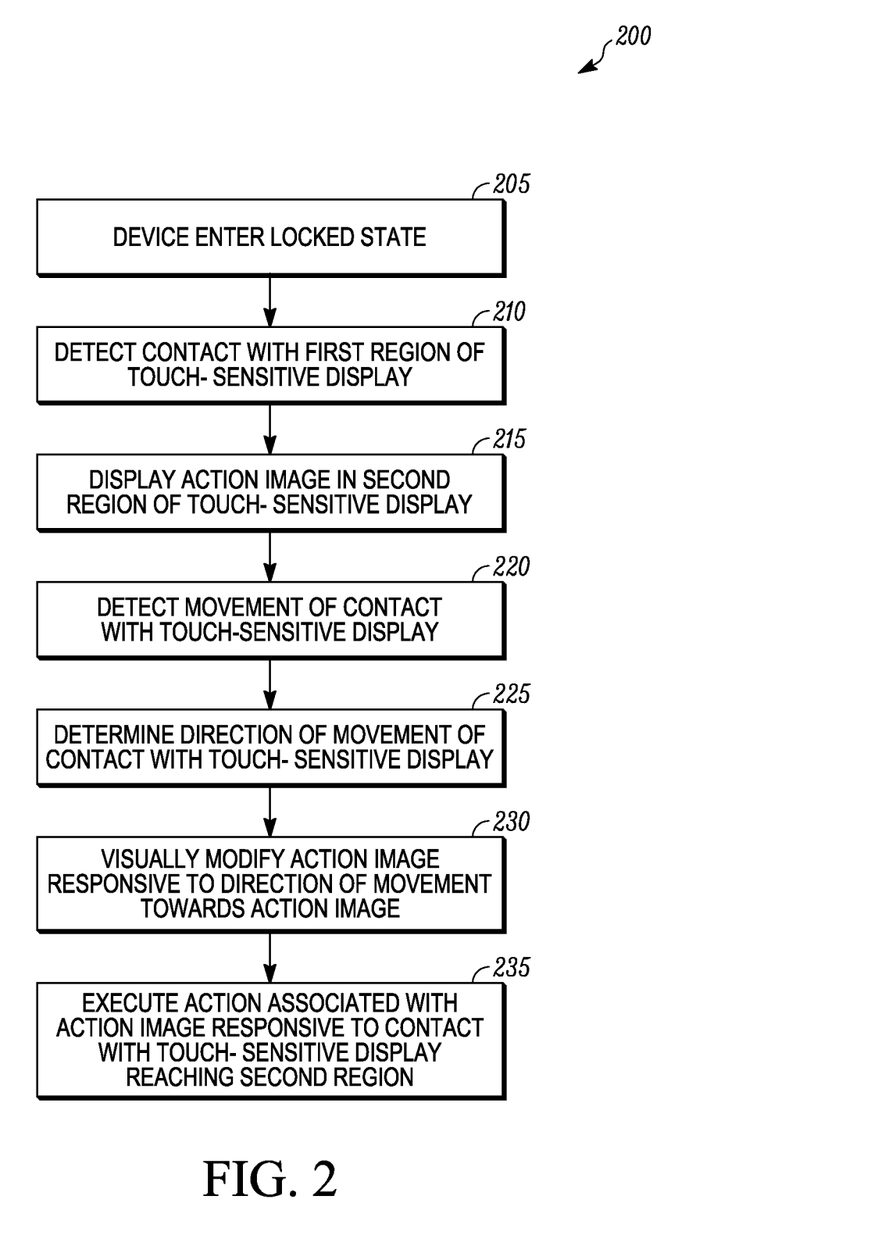
FIG. 2 is a flow chart of a method for performing an action from a locked state responsive to receiving an input via a touch-sensitive display in accordance with some embodiments.

FIG. 2 is a flow chart of a method 200 for performing an action from a locked state responsive to receiving an input via a touch-sensitive display 132. In some embodiments, the method 200 includes different and/or additional steps than those shown by FIG. 2. Moreover, in some embodiments, certain steps in the method 200 may be performed in a different order than illustrated by FIG. 2

The state determinator 122 determines that a locking condition is met, and generates an instruction causing the portable computing device 100 to enter 205 a locked state. For example, the state determinator 122 determines that the portable computing device 100 has been inactive or idle for a specified time interval or that an input to lock the portable computing device is received. When the portable computing device 100 enters the locked state, a lockscreen is displayed via the touch-sensitive display 132 indicating to a user that the portable computing device 100 is locked. In one embodiment, the lockscreen includes an unlock image in a first region of the touch-sensitive display 132.

Responsive to the input controller 124 detecting 210 contact with the first region of touch-sensitive display 132, in which the unlock image is displayed, the input controller 124 generates a signal causing an action image to be displayed 215 in a second region of the touch-sensitive display 132. The action image is associated with an action performed by the processor 110 of the portable computing device. In one embodiment, the action image includes a graphical representation of the action performed by the processor 110 when the second region is contacted. For example, the action image may comprise an unlock symbol to indicate transitioning of the portable computing device 100 to an unlock state or may comprise an image of an application to indicate an application executed when the second region including action image is contacted.

In one embodiment, the input controller 124 may cause a visual indicator of movement of the contact to execute the action associated with the action image. For example, the input controller 124 generates a text description that the contact should be moved from a starting point to the second region to perform the action associated with the action image displayed in the second region. As another example, the input controller 124 initiates display of one or more images depicting an example of movement of the contact towards the action image.

The input controller 124 detects 220 movement of the contact with the touch-sensitive display 132 and determines 225 a direction of movement of the contact with the touch sensitive display 132. While the contact with the touch-sensitive display 132 moves, the unlock image remains stationary in the first region. Hence, the displayed images remain stationary in the regions in which they are displayed while the contact with the touch-sensitive display moves. In one embodiment, the input controller 124 determines 225 the direction in which the initial contact with the first region of the touch sensitive display 132 moves. Alternatively, the input controller 124 may detect a second input with the touch sensitive display 132, separate from the contact with the first region of the touch-sensitive display 132, and determine 225 a direction in which the second contact moves.

Responsive to determining the direction of movement of the contact with the touch-sensitive display is in a direction towards the action image, the input controller 124 visually modifies 230 the action image. In one embodiment, the input controller 124 increases the size of the action image while decreasing the size of the unlock image to visually modify 230 the action image. Alternatively, the input controller 124 increases the brightness of the action image while decreasing the brightness of the unlock image. As another example, the input controller 124 generates data to display a targeting area, such as a circle or square, surrounding the action image or changes the color of the action image.

In one embodiment, multiple action images are displayed responsive detecting 210 contact with the first region of the touch-sensitive display 132. For example, a first action image is displayed in a second region of the touch sensitive display 132 and a second action image is displayed in a third region of the touch-sensitive display 132. Upon determining 225 that a direction of movement of a contact with the touch-sensitive display 132 is towards the first action image, the first action image and the second action image are visually modified 230 to draw attention to the first action image. For example, a brightness of the first action image is increased and the brightness of the second action image and of the unlock image is decreased. As another example, a size of the first action image is increased while the sizes of the second action image and of the unlock image are decreased.

Responsive to the contact with the touch-sensitive display 132 reaching the second region, the input controller 124 generates data communicated to the processor 110 or to another component of the portable computing device 100 to execute 235 an action associated with the action image. For example, responsive to the contact with the touch-sensitive display 132 reaching the second region, the input controller 124 communicates data to the status determinator 122 to transition the portable computing device 100 to the unlocked state. As another example, the input controller 124 generates data to execute an application associated with the action image responsive to the contact with the touch-sensitive display reaching the second image. Examples of executed applications include a telephone dialing application, a messaging application, an image capture application or any other suitable application.

The methods shown in FIG. 2 may be implemented in embodiments of hardware, software or combinations of hardware and software. In one embodiment, instructions for performing the actions described below are stored in the storage device 120 of the portable computing device 100, such as in the status determinator 122 and/or the input controller 124, and execution of the instructions by the processor 110 performs the actions described above in conjunction with FIG. 2.

Example Operation

Figure 3A:
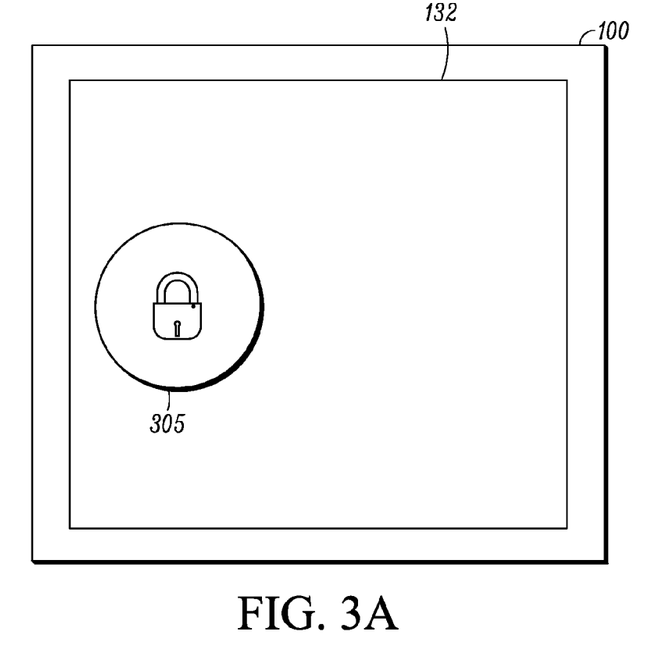
FIGS. 3A-3D illustrate an example a user interface for unlocking a device from a locked state in accordance with some embodiments.
Figure 3B:
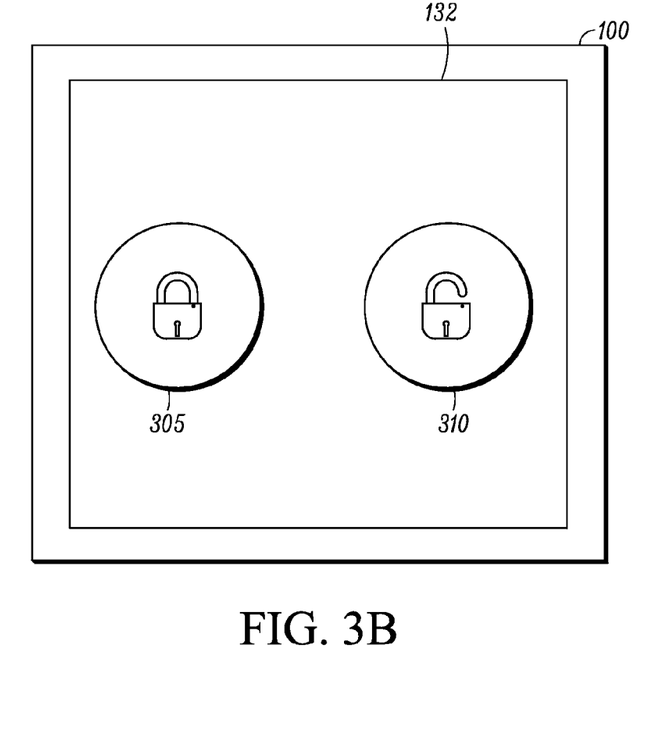

FIGS. 3A-3D illustrate an example user interface for unlocking a portable computing device 100 from a locked state in accordance with some embodiments. In FIG. 3A, the portable computing device 100 is in a locked state, so an unlock image 305 is displayed in a first region of a touch-sensitive display 132 of the portable computing device 100. In response to an input controller 124 detecting a contact with touch-sensitive display 132 within the first region, the touch-sensitive display 132 is modified to display an action image 310 in a second region, as shown in FIG. 3B. In the example of FIG. 3B, the unlock image 305 remains displayed in a first region of the touch-sensitive display 132 while the action image 122 is displayed in a second region of the touch-sensitive display 132.

Figure 3C:
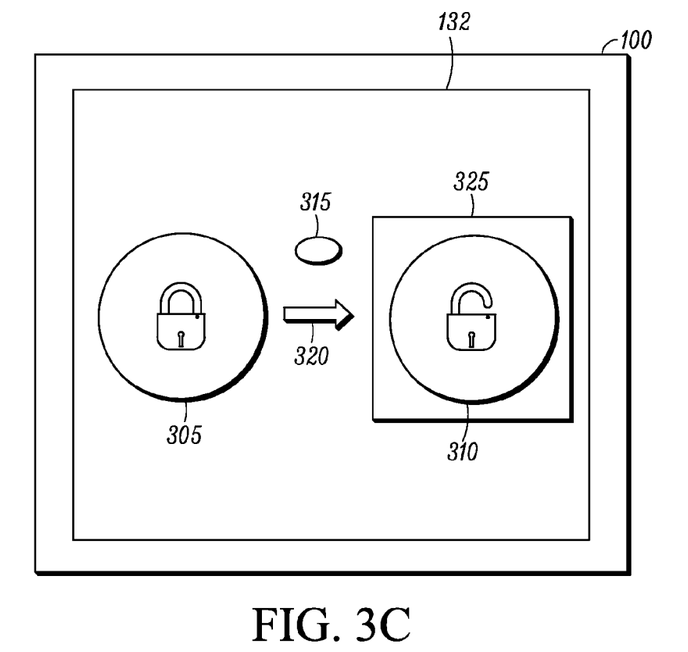

When the action image is displayed, the input controller 124 detects movement of a contact 315 with the touch-sensitive display 132 and determines a direction of movement 320 of the contact with the touch sensitive display 132. In the example of FIG. 3C, the input controller 124 determines that the direction of movement 320 of the contact 315 is towards the action image 310 and visually modifies the first action image by displaying a box 325 around the first action image. In other embodiments, the input controller 124 visually modifies the first action image by increasing its brightness, increasing its size or modifying its color. Additionally, the input controller 124 may also alter the appearance of the unlock image to increase the prominence of the action image. For example, the input controller 124 decreases the brightness of the unlock image, decreases the size of the unlock image or modifies the color of the unlock image in addition to modifying the display of the action image. This modification allows a user to more easily identify the direction in which the contact with the touch-sensitive display is moving.

Figure 3D:
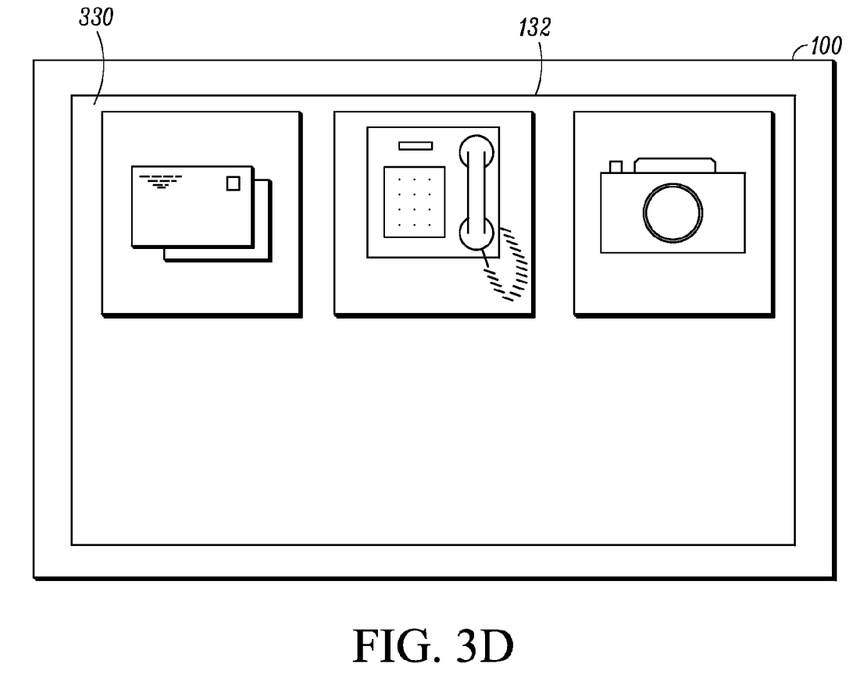

Responsive to the contact with the touch-sensitive display 132 reaching the second region, the input controller 124 generates data communicated to the processor 110 or to another component of the portable computing device 100 to execute an action associated with the action image. In the example of FIG. 3D, contact with the touch-sensitive display 132 reaching the second region causes the portable computing device 100 to transition to an unlocked state. In the unlocked state illustrated by FIG. 3D, icons associated with applications are displayed in different regions of the touch-sensitive display 132, allowing an application to be executed by contacting a corresponding region of the touch-sensitive display 132.

Figure 4A:
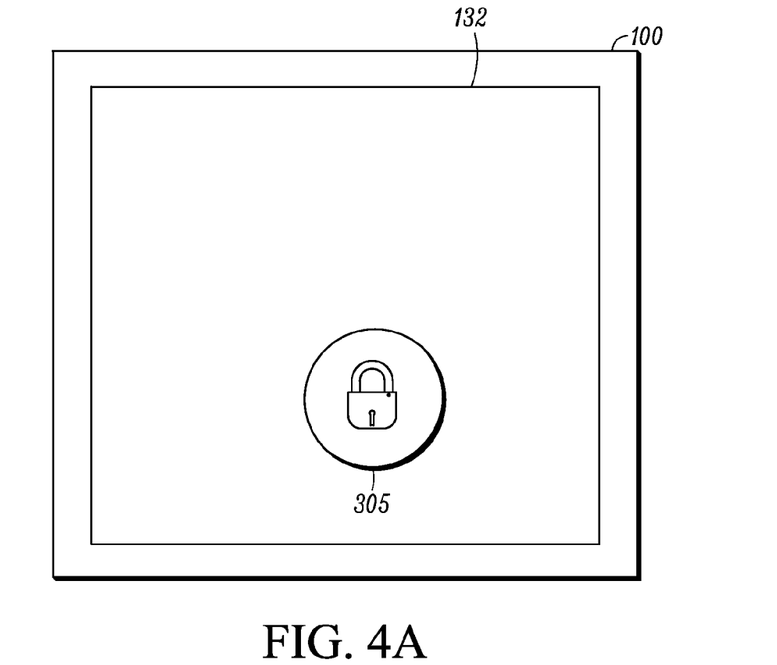
FIGS. 4A-4C illustrate an alternate example of a user interface for unlocking a device from a locked state in accordance with some embodiments.
Figure 4B:
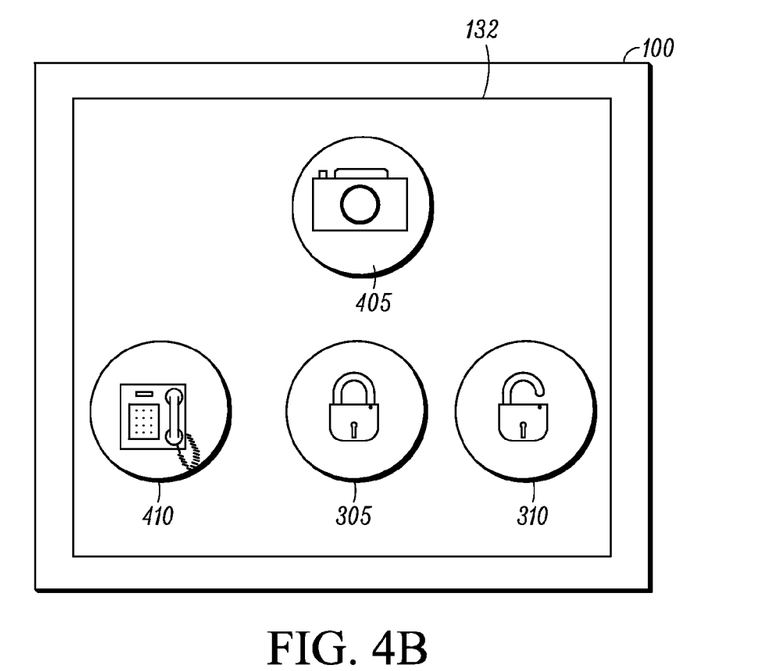
Figure 4C:
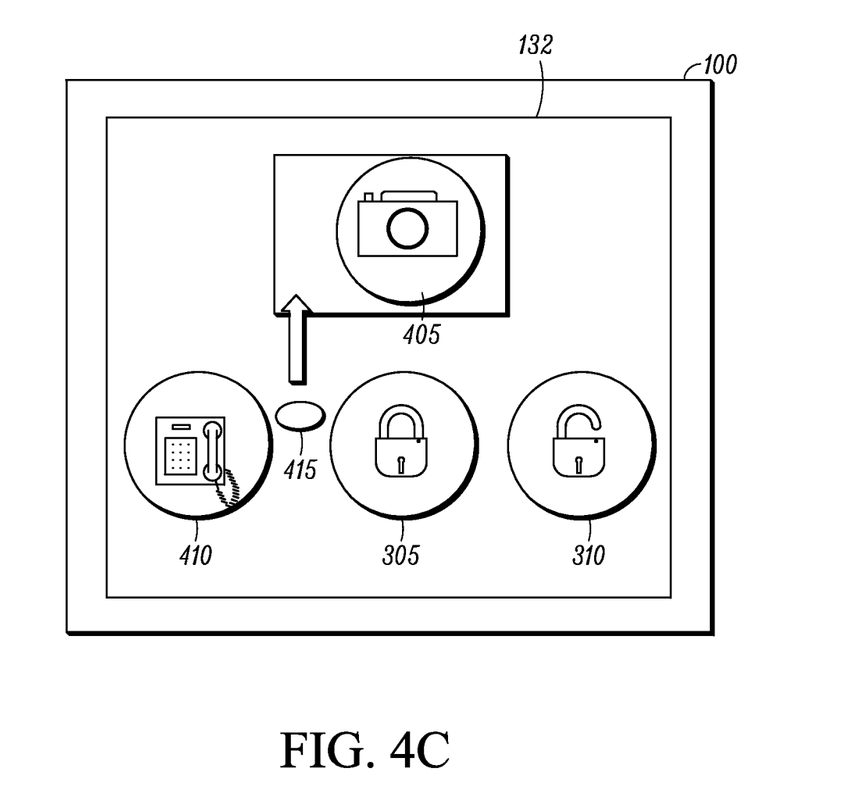

FIGS. 4A-4C illustrate an alternate example of a user interface for unlocking a portable computing device 100 from a locked state. In FIG. 4A, the portable computing device 100 is in a locked state, so an unlock image 305 is displayed in a first region of a touch-sensitive display 132 of the portable computing device 100. In response to an input controller 124 detecting a contact with touch-sensitive display 132 within the first region, the touch-sensitive display 132 is modified to display a first action image 310 in a second region, a second action image 405 in a third region and a third action image 410 in a fourth region, as shown in FIG. 4B. In the example of FIG. 4B, the unlock image 305 remains displayed in a first region of the touch-sensitive display 132 while the various action images are displayed in their corresponding regions.

In one embodiment, the first action image 310, the second action image 405, and the third action image 410 are displayed in regions identified by a user during a configuration process. For example, during the configuration process, a user identifies action images associated with different actions and also identifies regions of the touch-sensitive display used to display the action images when the portable computing device 100 is in a locked state. This allows the user to personalize the actions that may be performed from a locked state and to customize the regions where different action images are displayed to simplify how the user may initiate different actions. In one embodiment, the configuration process identifies a set of predetermined regions of the touch-sensitive display 132 and allows the user to identify an action image, and its corresponding action, with one or more regions within the set. In certain configurations, the configuration process may identify actions associated with a subset of regions of the touch-sensitive display 132 and allow user customization of action images associated with regions other than the subset of regions.

When the action images are displayed, the input controller 124 detects movement of a contact 415 with the touch-sensitive display 132 and determines a direction of movement of the contact 415 with the touch sensitive display 132. In the example of FIG. 4C, the input controller 124 determines that the contact is moving towards the second action image 405 and visually modifies the second action image 405 by displaying a box around the second action image 405. In other embodiments, the input controller 124 visually modifies the second action image 405 by increasing its brightness, increasing its size or modifying its color. Additionally, the input controller 124 may also alter the appearance of the unlock image 305, the first action image 310 and/or the third action image 410 to increase the prominence of the second action image 405. For example, the input controller 124 decreases the brightness of the unlock image 305, the first action image 310 and the third action image 410 while increasing the brightness of the second action image 405. As another example, the input controller 124 decreases the size of the unlock image 305, the first action image 310 and the third action image 410 while increasing the size of the second action image 405. This visual modification of the second action image 405 allows a user to easily identify the action that will be executed based on the direction of movement of the contact with the touch-sensitive display 132.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. In some embodiments, a combination of the two approaches may be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and/or integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for modifying a state of a portable computing device:
   detecting contact with a touch-sensitive display at a first region associated with an unlock image displayed responsive to the portable computing device being in a locked state;
   responsive to detecting contact with the touch-sensitive display at the first region, displaying a first action image in a second region of the touch-sensitive display and displaying a second action image in a third region of the touch-sensitive display, wherein the first region lies in between the second region and the third region;
   detecting movement of the contact with the touch-sensitive display, while the unlock image remains stationary at the first region;
   determining a direction of movement of the contact with the touch-sensitive display;
   responsive to determining the direction of movement of the contact is towards the first action image, visually modifying the first action image;
   responsive to determining the direction of movement of the contact is towards the second action image, visually modifying the second action image;
   responsive to the contact with the touch-sensitive display reaching the second region, executing an action associated with the first action image; and
   responsive to the contact with the touch-sensitive display reaching the third region, executing an action associated with the second action image.

2. The method of claim 1, wherein executing the action associated with the action image comprises:
   modifying the portable computing device from the locked state to an unlocked state.

3. The method of claim 1, wherein visually modifying the action image comprises increasing a size of the action image.

4. The method of claim 1, wherein visually modifying the action image comprises modifying one or more colors of the action image.

5. The method of claim 1, wherein visually modifying the action image comprises increasing a brightness of the action image.

6. The method of claim 1, visually modifying the action image and visually modifying the second action image comprises:
   increasing a size of the action image; and
   decreasing a size of the second action image.

7. The method of claim 1, visually modifying the action image and visually modifying the second action image comprises:
   increasing a brightness of the action image; and
   decreasing a brightness of the second action image.

8. The method of claim 1, wherein the second action comprises at least one of executing a messaging application, executing an image capture application or executing a telephone dialer application.

9. The method of claim 1, further comprising:
   displaying a visual indication of movement of the contact to execute the action associated with the action image.

10. A device comprising:
    a touch-sensitive display;
    a processor coupled to the touch-sensitive display; and
    a storage device coupled to the processor, the storage device including instructions that, when executed by the processor, cause the processor to:
      detect contact with the touch-sensitive display at a first region associated with an unlock image;
      responsive to detecting contact with the touch-sensitive display at the first region, display a first action image in a second region of the touch-sensitive display and display a second action image in a third region of the touch-sensitive display, wherein the first region lies in between the second region and the third region;
      detect movement of the contact with the touch-sensitive display, while the unlock image remains stationary at the first region;
      determine a direction of movement of the contact with the touch-sensitive display;
      responsive to determining the direction of movement of the contact is towards the first action image, visually modify the first action image;
      responsive to determining the direction of movement of the contact is towards the second action image, visually modifying the second action image;
      responsive to the contact with the touch-sensitive display reaching the second region, executing an action associated with the first action image; and
      responsive to the contact with the touch-sensitive display reaching the third region, execute an action associated with the second action image.

11. The device of claim 10, wherein execute the action associated with the action image comprises:
    transition the device from a locked state to an unlocked state.

12. The device of claim 10, wherein visually modify the action image comprises: increase a size of the action image.

13. The device of claim 10, wherein visually modify the action image comprises:
    increase a brightness of the action image.

14. The device of claim 10, wherein visually modify the action image and visually modify the second action image comprises:
    increase a size of the action image; and
    decrease a size of the second action image.

15. The device of claim 10, wherein visually modify the action image and visually modify the second action image comprises:
    increase a brightness of the action image; and
    decrease a brightness of the second action image.

16. A non-transitory computer readable storage medium including instructions that, when executed by a processor, cause the processor to:
    detect contact with the touch-sensitive display at a first region associated with an unlock image;
    responsive to detecting contact with the touch-sensitive display at the first region, display a first action image in a second region of the touch-sensitive display and display a second action image in a third region of the touch-sensitive display, wherein the first region lies in between the second region and the third region;
    detect movement of the contact with the touch-sensitive display, while the unlock image remains stationary at the first region;
    determine a direction of movement of the contact with the touch-sensitive display;

responsive to determining the direction of movement of the contact is towards the first action image, visually modify the first action image;

responsive to determining the direction of movement of the contact is towards the second action image, visually modifying the second action image;

responsive to the contact with the touch-sensitive display reaching the second region, executing an action associated with the first action image; and responsive to the contact with the touch-sensitive display reaching the third region, execute an action associated with the second action image.

17. The non-transitory computer readable storage medium of claim 16, wherein execute the action associated with the action image comprises:

transition a device coupled to the processor from a locked state to an unlocked state.

18. A method for modifying a state of a portable computing device comprising:

detecting contact with a touch-sensitive display at a first region associated with an unlock image displayed responsive to the portable computing device being in a locked state;

responsive to detecting contact with the touch-sensitive display at the first region, displaying a first action images in a second region of the touch-sensitive display, wherein the first action image is displayed in a region of the touch-sensitive display identified during a configuration process; and displaying a second action image in a third region of the touch-sensitive display, wherein the second action image is displayed in a region of the touch-sensitive display identified during the configuration process;

detecting movement of the contact with the touch-sensitive display, while the unlock image remains stationary at the first region;

determining a direction of movement of the contact with the touch-sensitive display;

responsive to determining the direction of movement of the contact is towards the first action image, visually modifying the first action image;

responsive to determining the direction of movement of the contact is towards the second action image, visually modifying the second action image;

responsive to the contact with the touch-sensitive display reaching the second region including the first action image, executed an action associated with the first action image; and responsive to the contact with the touch-sensitive display reaching the third region including the second action image, executing an action associated with the second action image.

* * * * *